(12) United States Patent
Yamamoto

(10) Patent No.: US 6,312,795 B1
(45) Date of Patent: Nov. 6, 2001

(54) MAGNETIC SHEET

(75) Inventor: Kazumi Yamamoto, Hiroshima-ken (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 09/421,123

(22) Filed: Oct. 19, 1999

(30) Foreign Application Priority Data

Sep. 1, 1999 (JP) .................................................. 11-247742

(51) Int. Cl.$^7$ ....................................................... B32B 5/16
(52) U.S. Cl. ...................... 428/323; 428/329; 428/500; 428/689; 252/62.54; 252/62.55
(58) Field of Search ..................................... 428/323, 328, 428/500, 688, 689, 692, 697, 694 B, 694 BN, 694 BA, 694 BH, 913; 252/62.51 R, 62.54, 62.55; 524/413, 543, 575, 581, 584

(56) References Cited

U.S. PATENT DOCUMENTS 4,308,155 * 12/1981 Tada et al. ......................... 252/62.54
5,429,899 * 7/1995 Chiba et al. ....................... 430/106.6

FOREIGN PATENT DOCUMENTS

1081721A2 * 7/2001 (EP) .
63 260112 10/1988 (JP) .
61 067203 4/1996 (JP) .

* cited by examiner

Primary Examiner—Paul Thibodeau
Assistant Examiner—Sheeba Ahmed
(74) Attorney, Agent, or Firm—Nixon & Vanderhye

(57) ABSTRACT

A magnetic sheet of the present invention comprises:

400 to 1,900 parts by weight of at least one kind of magnetic particles selected from the group consisting of magnetoplumbite-structure ferrite particles and rare-earth magnet particles, as a filler; and 100 parts by weight of a binder comprising 50 to 95% by weight of at least one thermoplastic elastomer selected from the group consisting of a styrene-isoprene-styrene block copolymer resin, a styrene-ethylene-butylene-styrene block copolymer resin and an ethylene-propylene copolymer rubber, and 5 to 50% by weight of at least one soft polyolefin selected from the group consisting of a propylene homopolymer and a propylene-ethylene copolymer.

Such magnetic sheet is excellent in flexibility, mechanical properties, storage stability and product stability, and wherein the content of magnetic particles can be considerably enhanced notwithstanding the amounts of plasticizer and lubricant used therein are considerably minimized.

14 Claims, No Drawings

MAGNETIC SHEET

BACKGROUND OF THE INVENTION

The present invention relates to a magnetic sheet, and more particularly, to a magnetic sheet which is excellent in flexibility, mechanical properties, storage stability and product stability, and wherein the content of magnetic particles can be considerably enhanced notwithstanding the amounts of plasticizer and lubricant used therein are considerably minimized.

Magnetic sheets have been produced by molding a composition comprising a binder and magnetic particles as a filler into a sheet having a thickness of 0.1 to 10 mm, and then magnetizing the obtained sheet. These magnetic sheets have been widely used in various application fields such as marks for sign or display, beginner's marks for automobiles, various fitting or attaching sheets as stationaries or office supplies, or sealing materials for doors, e.g., door packings for refrigerators.

In the case where the magnetic sheet is fitted or attached to various objects, it is necessary that the magnetic sheet is prevented from being slipped off or fallen off from the predetermined position. Further, when the magnetic sheet is used as a sealing material for doors, it is necessary that the door can be brought into close contact with a body of equipment. In order to satisfy the above-described requirements, it has been demanded to enhance a filling property of magnetic particles in the magnetic sheet, i.e., to increase a content of magnetic particles in the magnetic sheet, thereby obtaining a large magnetic flux density on the surface of the magnetic sheet.

In general, the articles or objects to which the magnetic sheet is to be fitted or attached, have not only simple flat surfaces but also irregular, partially sloped or complicated surfaces. In order to allow the magnetic sheet to be fitted or attached onto such various surfaces in a close contact manner, and to be readily detached therefrom, the magnetic sheet has been required to exhibit a good flexibility.

Also, it has been required that the magnetic sheet is free from partial breakage or tear even after repeatedly attached and detached for a long period of time, namely the magnetic sheet has been required to show an excellent mechanical strength.

From the description in Japanese Patent Application Laid-Open (KOKAI) No. 11-49904(1999): "as sound-insulating materials, there have been proposed sheets prepared by adding a filler having a high specific gravity to a rubber component. These sound-insulating materials are stored in stacks at factories or building sites after the production thereof until these materials are applied to apartment houses or individual detached houses. Here, there arises such a problem that the stacked sheets suffer from blocking therebetween during the storage, especially under high-temperature and high-humidity conditions such as in the summer season, because the rubber component is contained therein."; and in Japanese Patent Application Laid-Open (KOKAI) No. 11-90991(1999): "as damping sheets used for a folding plate-type roof, there have been proposed composite damping materials comprising an elastomer and inorganic particles. However, in the case where the composite damping material is wound up into a roll upon the production thereof, it has been sometimes difficult to draw the sheet out of the roll because the composite damping material itself has a stickiness. In particular, under high-temperature conditions such as during the summer season or the like, such a tendency becomes remarkable. As a result, there arises such a problem that portions of the rolled composite damping material are adhered together, so that it is not possible to draw the sheet out of the roll.", in the case where magnetic sheets are preserved or stored in stacks, there tends to be caused such a phenomenon that the surfaces of these magnetic sheets are stuck together due to a rubber component contained in the resin, namely so-called blocking between the sheet is likely to occur. For this reason, it has been demanded to provide a magnetic sheet which is free from blocking during preservation or storage, i.e., is excellent in so-called storage stability.

Also, when the magnetic sheet is kept fitted or attached onto any objects or articles for a long period of time, the plasticizer contained in the magnetic sheet is bled out, so that the stickiness of the magnetic sheet is increased. In this condition, when the magnetic sheet is detached from the surfaces of the objects or articles, there tends to arise such a phenomenon that the surfaces of the objects or articles are contaminated with a sticky material peeled off from the rear surface of the magnetic sheet, i.e., so-called fogging phenomenon is likely to occur. Therefore, it has also been demanded to provide a magnetic sheet which is free from any contamination even when being kept fitted or attached for a long period of time, namely is excellent in so-called product stability.

As conventional magnetic sheets exhibiting an enhanced filling property of magnetic particles and a good flexibility, there have been widely used magnetic sheets in which a chlorine-containing resin such as, typically, polyethylene chloride, vinyl chloride, chlorosulfonated polyethylene or the like is used as a binder, and a plasticizer and a lubricant are mixed or blended therein in amounts of 1 to 120 parts by weight and 1 to 30 parts by weight, respectively, based on 100 parts by weight of the total amount of the binder.

In the above Japanese Patent Application Laid-Open (KOKAI) No. 11-90991(1999), there has been described the magnetic sheet using a styrene-isoprene block copolymer and an ethylene-vinyl acetate copolymer as a binder.

Also, European Patent Publication No. 0 690 092 A1 discloses a damping material comprising:

(a) a binder resin composed of 85 to 99% by weight of at least one base resin selected from polypropylenes, polystyrenes, acrylonitrile-butadiene-styrene copolymers, polycarbonates, polyphenylene ethers and modified polyphenylene ethers, and 1 to 15% by weight of styrene-isoprene-styrene block copolymer; and (b) 1 to 20 parts by weight, per 100 parts by weight of the binder resin, of iron compound particles.

It has been demanded to provide a magnetic sheet which is not only excellent in flexibility, mechanical strength, storage stability and product stability, but also can be considerably enhanced in content of magnetic particles. However, such magnetic sheets cannot be obtained yet.

Namely, in the above-described conventional magnetic sheet using the chlorine-containing resin as a binder, it is essentially required to not only increase the content of magnetic particles but also add a so-called plasticizer for imparting a plasticity and processability to the magnetic sheet, so that the plasticizer added tends to be bled out with the passage of time. For this reason, the conventional magnetic sheet is deteriorated in product stability as well as storage stability.

In addition, in the case where a lubricant is added in order to enhance the flowability of the chlorine-containing resin, the filling property, mechanical strength and product stability of the magnetic sheet can be improved. However, there arises such a problem that the magnetic sheet is extremely deteriorated in flexibility.

As is known in the art, chlorine-containing resins tend to generate harmful gases such as chlorine gas during processing thereof and, therefore, adversely affect the working environments. Also, when the chlorine-containing resins are incinerated upon disposal, harmful substances such as dioxin are produced, so that there is caused a problem that the environmental conditions are adversely affected.

Further, in the case of the magnetic sheet described in the above Japanese Patent Application Laid-Open (KOKAI) No. 11-90991(1999), when the content of magnetic particles is increased, the storage stability and product stability of the obtained magnetic sheet becomes deteriorated, as described in Comparative Examples hereinlater.

As a result of the present inventors' earnest studies for solving the above problems, it has been found that by using as a binder, a resin composition comprising 50 to 95% by weight of a thermoplastic elastomer of a styrene-isoprene-styrene block copolymer, a styrene-ethylene-butylene-styrene block copolymer and/or an ethylene-propylene copolymer rubber, and 5 to 50% by weight of a soft polyolefin of a propylene homopolymer and/or a propylene-ethylene copolymer, the obtained magnetic sheet is not only excellent in flexibility, mechanical strength, storage stability and product stability but also exhibits a high filling property of magnetic particles, and is free from the generation of harmful substances such as dioxin even when subjected to incineration upon disposal, since no chlorine-containing resin is used as a binder therein. The present invention has been attained on the basis of this finding.

SUMMARY OF THE INVENTION

It is an object of the present invention to provide a magnetic sheet which can be considerably enhanced in content of magnetic particles even when the amounts of plasticizer and lubricant used therein are considerably minimized, especially even when any plasticizer is not used. It is another object of the present invention to provide a magnetic sheet which is excellent in flexibility, mechanical strength, storage stability and product stability.

To accomplish the aims, in a first aspect of the present invention, there is provided a magnetic sheet comprising:

400 to 1,900 parts by weight of at least one kind of magnetic particles selected from the group consisting of magnetoplumbite-structure ferrite particles and rare-earth magnet particles as a filler; and 100 parts by weight of a binder comprising:

50 to 95% by weight of at least one thermoplastic elastomer selected from the group consisting of a styrene-isoprene-styrene block copolymer resin, a styrene-ethylene•butylene-styrene block copolymer resin and an ethylene-propylene copolymer rubber, and 5 to 50% by weight of at least one soft polyolefin selected from the group consisting of a propylene homopolymer and a propylene-ethylene copolymer.

In a second aspect of the present invention, there is provided a magnetic sheet comprising:

400 to 1,900 parts by weight of at least one kind of magnetic particles selected from the group consisting of magnetoplumbite-structure ferrite particles and rare-earth magnet particles as a filler; and 100 parts by weight of a binder comprising:

at least one thermoplastic elastomer selected from the group consisting of a styrene-isoprene-styrene block copolymer resin, a styrene-ethylene-butylene-styrene block copolymer resin and an ethylene-propylene copolymer rubber, in amount of 50 to 95% by weight based on the total weight of the thermoplastic elastomer and a soft polyolefin, at least one soft polyolefin selected from the group consisting of a propylene homopolymer and a propylene-ethylene copolymer, in amount of 5 to 50% by weight based on the total weight of the thermoplastic elastomer and a soft polyolefin, and at least one modified resin selected from the group consisting of an ethylene-propylene-diene copolymer rubber and an ethylene-butene copolymer resin, in an amount of 5 to 30 parts by weight based on 100 parts by weight of the total amount of said thermoplastic elastomer and said soft polyolefin.

DETAILED DESCRIPTION OF THE INVENTION

The present invention will be described in detail below.

First, the magnetic sheet according to the present invention is explained.

The magnetic sheet according to the present invention can be produced by molding a composition which comprises magnetic particles as a filler, and a binder comprising at least one thermoplastic elastomer selected from the group consisting of a styrene-isoprene-styrene block copolymer, a styrene-ethylene•butylene-styrene block copolymer and an ethylene-propylene copolymer rubber, at least one soft polyolefin selected from the group consisting of a propylene homopolymer and a propylene-ethylene copolymer, and if required, at least one modified resin selected from the group consisting of an ethylene-propylene-diene copolymer rubber and an ethylene-butene copolymer, into a sheet.

As the styrene blocks of the styrene-isoprene-styrene block copolymer used as the thermoplastic elastomer in the present invention, there may be exemplified anionically polymerizable aromatic vinyl monomers such as styrene, 1-vinyl naphthalene, 2-vinyl naphthalene, 3-methyl styrene, 4-propyl styrene, 4-cyclohexyl styrene, 4-dodecyl styrene, 2-ethyl-4-benzyl styrene, 4-phenylbutyl styrene or the like. Among these monomers, styrene is especially preferred.

As the suitable isoprene blocks constituting a rubber component of the styrene-isoprene-styrene block copolymer, there may be exemplified isoprene or isoprene-butadiene. The content of the rubber component is preferably 40 to 90% by weight, more preferably 50 to 90% by weight based on the weight of the styrene-isoprene-styrene block copolymer. In the case of isoprene, in the consideration of tensile strength of the obtained magnetic sheet, the content of vinyl bonds therein is preferably not less than 40% by weight, more preferably 50 to 80% by weight based on the weight of the styrene-isoprene-styrene block copolymer. In the case of isoprene-butadiene, in the consideration of flexibility of the obtained magnetic sheet, the content of the isoprene therein is preferably not less than 40% by weight, more preferably 50 to 80% by weight based on the weight of the styrene-isoprene-styrene block copolymer. The copolymer structure in the isoprene block may be either random, block or tapered.

The styrene-isoprene-styrene block copolymer has a density of usually 0.92 to 0.95 g/cc and a number-average molecular weight of usually 30,000 to 300,000. When the density of the styrene-isoprene-styrene block copolymer is less than 0.92 g/cc or when the number-average molecular weight thereof is less than 30,000, there may be a tendency that the block copolymer itself may be deteriorated in mechanical properties such as breaking strength, ductility or the like. When the density of the styrene-isoprene-styrene block copolymer is more than 0.95 g/cc or when the number-average molecular weight thereof is more than 300,000, the block copolymer may tend to be deteriorated in processability. The density of the styrene-isoprene-styrene block copolymer is preferably 0.93 to 0.94 g/cc, and the number-average molecular weight thereof is preferably 80,000 to 250,000.

The structure of blocks of the styrene-isoprene-styrene block copolymer may be represented by $A(BA)_n$ or $(AB)_n$, wherein A is a styrene block; B is an isoprene block; and n is an integer of not less than 1. Among these structures, $A(BA)_n$ is preferred.

As the above styrene-isoprene-styrene block copolymer, there may be used commercially available products such as HYBRAR VS-1 (tradename, produced by Kuraray Co., Ltd.) or the like.

The styrene-ethylene-butylene-styrene block copolymer used as the thermoplastic elastomer in the present invention, may be produced by first producing a styrene-butadiene-styrene block copolymer by subjecting styrene and diene to anionic polymerization in the presence of an alkyl lithium catalyst in a hydrocarbon solvent such as n-hexane or cyclohexane, and then hydrogenating the obtained styrene-butadiene-styrene block copolymer in a hydrocarbon solvent. The content of the ethylene•butylene block as a rubber component is preferably 63 to 87% by weight, more preferably 70 to 87% by weight. In the consideration of flexibility of the obtained magnetic sheet, the weight ratio of styrene to ethylene-butylene is preferably 13:87 to 37:63, more preferably 13:87 to 30:70. The density of the styrene-ethylene-butylene-styrene block copolymer is preferably 0.90 to 0.91 g/cc.

As the styrene-ethylene•butylene-styrene block copolymer resin, there may be exemplified commercially available products such as CRAYTON G1657 (tradename, produced by Shell Chemical Company) or the like.

As the ethylene-propylene copolymer rubber used as the thermoplastic elastomer in the present invention, there may be exemplified:

1) Resin blends comprising polyolefin such as polypropylene or polyethylene as a hard segment, and an ethylene-propylene rubber as a soft segment;
2) Resins prepared by polymerizing polypropylene or polyethylene as a hard segment with an ethylene-propylene rubber as a soft segment; or
3) Resins prepared by vulcanizing a soft segment in a blend comprising polypropylene or polyethylene as a hard segment and an ethylene-propylene rubber as the soft segment.

The content of the ethylene-propylene rubber as the soft segment, i.e., a rubber component is preferably not less than 20% by weight based on the weight of the ethylene-propylene copolymer rubber, and the specific gravity thereof is preferably 0.86 to 0.88.

When the content of the ethylene-propylene rubber as a rubber component is less than 20% by weight, although the filling property of magnetic particles can be enhanced, the flexibility of the obtained magnetic sheet may tend to be deteriorated. In the consideration of the filling property of magnetic particles and the flexibility of the obtained magnetic sheet, the content of the ethylene•propylene rubber as a rubber component is more preferably 32 to 52% by weight, still more preferably 32 to 49% by weight based on the weight of the ethylene-propylene copolymer rubber, and the specific gravity thereof is more preferably 0.87 to 0.88.

As the above-described ethylene-propylene copolymer rubber, there may be used commercially available products such as EPT3070 (tradename, produced by Mitsui Chemicals Corporation).

The thermoplastic elastomers used in the present invention may be used singly or in the form of a mixture of any two or more thereof. In the case where the styrene-ethylene•butylene-styrene block copolymer and the styrene-isoprene-styrene block copolymer are used in combination, the weight ratio of the styrene-ethylene•butylene-styrene block copolymer to the styrene-isoprene-styrene block copolymer is preferably 1:1 to 2:1. In the consideration of flexibility of the obtained magnetic sheet, the styrene-ethylene•butylene-styrene block copolymer is preferred.

The amount of the thermoplastic elastomer in the binder used in the present invention is usually 50 to 95% by weight based on the weight of the total amount of the thermoplastic elastomer and the soft polyolefin resin.

When the amount of the thermoplastic elastomer blended is less than 50% by weight, it may become difficult to obtain a magnetic sheet having a sufficient flexibility, and the obtained magnetic sheet may tend to be deteriorated in product stability and storage stability.

When the amount of the thermoplastic elastomer blended is more than 95% by weight, it may become difficult to obtain a magnetic sheet which is sufficiently enhanced in filling property of magnetic particles.

In the consideration of the filling property of magnetic particles and the flexibility of the obtained magnetic sheet, the amount of the thermoplastic elastomer blended is preferably 55 to 90% by weight, more preferably 60 to 85% by weight based on the total amount of the thermoplastic elastomer and the soft polyolefin resin.

The soft polyolefin used in the present invention, has a melt flow rate at 230° C. according to ASTM D1238 of usually 1 to 40 g/10 min, a density of preferably 0.87 to 0.89 g/cc and a softening point of preferably 40 to 112° C.

The propylene homopolymer used as the soft polyolefin in the present invention, has a melt flow rate at 230° C. according to ASTM D1238 of usually 1 to 40 g/10 min., more preferably 2 to 20 g/10 min., still more preferably 10 to 20 g/10 min., and a flexural modulus according to ASTM D1238 of usually 30 to 300 MPa, preferably 30 to 150 MPa.

The density of the propylene homopolymer is preferably 0.87 to 0.89 g/cc, and the softening point thereof is preferably 40 to 112° C., more preferably 40 to 100° C.

As the above propylene homopolymer, there may be used commercially available products such as FPOW101 (tradename, produced by Huntsman Chemical Corporation) or the like.

The propylene-ethylene copolymer used as the soft polyolefin in the present invention, has a melt flow rate at 230° C. according to ASTM D1238 of usually 1 to 40 g/10 min., more preferably 2 to 20 g/10 min., still more preferably 10 to 20 g/10 min., and a flexural modulus according to ASTM D1238 of usually 30 to 300 MPa, preferably 30 to 150 MPa.

The density of the propylene-ethylene copolymer used is preferably 0.87 to 0.89 g/cc, and the softening point thereof is preferably 40 to 112° C., more preferably 40 to 100° C.

As the above propylene-ethylene copolymer, there may be used commercially available products such as FPOW201 (tradename, produced by Huntsman Chemical Corporation) or the like.

The soft polyolefins used in the present invention may be used singly or in the form of a mixture of any two or more thereof. In the consideration of the flexibility and mechanical strength of the obtained magnetic sheet, the use of the propylene-ethylene copolymer is preferred.

The amount of the soft polyolefin blended in the magnetic sheet according to the present invention is usually 5 to 50% by weight based on the weight of the total amount of thermoplastic elastomer and the soft polyolefin resin.

When the amount of the soft polyolefin blended is less than 5% by weight, the filling property of magnetic particles may be deteriorated, so that the content of the magnetic particles may become insufficient, and as a result, the obtained magnetic sheet may be insufficient in surface magnetic flux density, and may show a tensile strength as low as less than 2.0.

When the amount of the soft polyolefin blended is more than 50% by weight, the obtained magnetic may be deteriorated in foldability, i.e., flexibility. In the consideration of the filling property of magnetic particles and the flexibility of the obtained magnetic sheet, the amount of the soft polyolefin blended is preferably 10 to 45% by weight, more preferably 15 to 40% by weight based on the weight of the total amount of the thermoplastic elastomer and the soft polyolefin resin.

At least one of modified resins selected from the group consisting of an ethylene-propylene-diene copolymer rubber and an ethylene-butene copolymer resin, may be inserted to the binder composed of the thermoplastic elastomer and the soft polyolefin resin.

The content of the propylene block of the ethylene-propylene-diene copolymer rubber used as the modified resin in the present invention, is preferably 20 to 30% by weight, more preferably 25 to 28% by weight. The ethylene-propylene-diene copolymer rubber has a melt flow rate at 230° C. according to ASTM D1238 of usually not less than 0.1 g/10 min. and less than 1 g/10 min., preferably 0.2 to 0.8 g/10 min., and a Mooney viscosity (at 100° C.) of preferably 10 to 90, more preferably 70 to 88.

As the above ethylene-propylene-diene copolymer rubber, there may be used commercially available products such as EP57P (tradename, produced by JSR Co., Ltd.) or the like.

The ethylene-butene copolymer used as the modified resin in the present invention, may be either crystalline or amorphous. Among them, the amorphous ethylene-butene random copolymers are preferred. The butene content of the ethylene-butene copolymer is preferably 18 to 35% by weight, more preferably 20 to 32% by weight.

In addition, the Vicat softening point of the ethylene-butene copolymer according to JIS K7206 is preferably 30 to 60° C., more preferably 40 to 60° C.

As the above ethylene-butene copolymer, there may be used commercially available products such as EBM2011P (tradename, produced by JSR Co., Ltd.) or the like.

The amount of the modified resin blended in the magnetic sheet according to the present invention, is usually 5 to 30 parts by weight, preferably 7 to 20 parts by weight based on 100 parts by weight of the total amount of the thermoplastic elastomer and the soft polyolefin resin.

When the amount of the modified resin blended is less than 5 parts by weight, it may be difficult to obtain a more improvements of a sufficient storage stability.

When the amount of the modified resin blended is more than 30 parts by weight, it may be difficult to obtain a magnetic sheet which is sufficiently enhanced in filling property of magnetic particles.

The magnetic particles used in the present invention may be composed of magnetoplumbite-structure ferrite particles and/or rare-earth magnet particles which exhibit a surface magnetic flux density of not less than 200 Gauss when incorporated in the magnetic sheet, measured by a method of Examples described later.

As the magnetoplumbite-structure ferrite particles, there may be exemplified barium ferrite particles, strontium ferrite particles or barium-strontium ferrite particles, which are represented by the formula: $AO.nFe_2O_3$, wherein A is Ba, Sr or Ba—Sr; and n is 5.0 to 6.5, or barium ferrite particles, strontium ferrite particles or barium-strontium ferrite particles further containing at least one element selected from the group consisting of Ti, Mn, Al, La, Zn, Bi and Co, in an amount of 0.1 to 7.0 mol %. The magnetoplumbite-structure ferrite particles used in the present invention, have an average particle size of usually 0.1 to 20.0 $\mu$m, preferably 1.0 to 5.0 $\mu$m, more preferably 1.0 to 2.0 $\mu$m; a BET specific surface area of usually 1 to 10 $m^2/g$, preferably 1 to 5 $m^2/g$, more preferably 1 to 2 $m^2/g$; a coercive force (IHc) of usually 1,500 to 7,000 Oe, preferably 1,500 to 4,000 Oe, more preferably 1,500 to 2,000 Oe; and a residual magnetization of usually 20 to 60 emu/g, preferably 30 to 50 emu/g, more preferably 30 to 40 emu/g.

As the magnetoplumbite-structure ferrite particles, there may be used commercially available products such as GP-300 (tradename, produced by Toda Kogyo Corporation), HM410 (tradename, produced by Hoosier Magnetics Co., Ltd.) or the like.

As the rare-earth magnet particles, there may be exemplified rare-earth magnet particles represented by the formula: R—T—B or R—T—N, wherein R is at least one element selected from the group consisting of Sc, Y, La, Ce, Pr, Nd, Pm, Sm, Eu, Gd, Tb, Dy, Ho, Er, Tm, Yb and Lu; and T is at least one element selected from the group consisting of Fe, Co, Ni, Ga and Ti. Among them, rare-earth magnet particles represented by the above-described formulae, wherein R is Nd (a part of Nd may be substituted with any other rare earth element); and T is Fe (a part of Fe may be substituted with at least one element selected from the group consisting of Co, Ga and Ti), are preferred. The rare-earth magnet particles have an average particle size of usually 1 to 100 $\mu$m, preferably 1 to 80 $\mu$m, more preferably 3 to 50 atm; a BET specific surface area of usually 0.5 to 2 $m^2/g$, preferably 0.7 to 1.8 $m^2/g$; a coercive force (IHc) of usually 3,000 to 9,000 Oe, preferably 4,000 to 9,000 Oe; and a residual magnetization of usually 80 to 400 emu/g, preferably 100 to 400 emu/g.

As the rare-earth magnet particles, there may be used commercially available products such as MQP-B (tradename, produced by Magnequench Co., Ltd.) or the like.

The amount of the magnetic particles used in the magnetic sheet according to the present invention, is usually 400 to 1,900 parts by weight, preferably 600 to 1,800 parts by weight based on 100 parts by weight of the total amount of the thermoplastic elastomer and the soft polyolefin resin, or the total amount of the thermoplastic elastomer, the soft polyolefin resin and the modified resin.

When the amount of the magnetic particles used is less than 400 parts by weight, the obtained magnetic sheet may not exhibit a sufficient surface magnetic flux density and, therefore, may be deteriorated in magnetic force.

When the amount of the magnetic particles used is more than 1,900 parts by weight, the obtained magnetic sheet may not exhibit a sufficient flexibility due to less content of resin components.

The magnetic sheet according to the present invention has a thickness of usually 0.1 to 10 mm.

The magnetic sheet according to the present invention has a surface magnetic flux density of usually 200 to 800 Gauss, preferably 300 to 800 Gauss measured by the method of the Examples described later.

When the surface magnetic flux density is less than 200 Gauss, the magnetic sheet fitted or attached may tend to be readily slipped or fallen off even when being exposed to weak vibration or contact, due to less magnetic force thereof.

The upper limit of the surface magnetic flux density of the magnetic sheet is 800 Gauss at most. An excessive magnetization of the magnetic sheet is unnecessary and meaningless. When the surface magnetic flux density is more than 800 Gauss, the magnetic attraction force of the magnetic sheet becomes too strong. As a result, for example, it tends to be difficult to change the fitting or attaching position of the magnetic sheet. Further, when such magnetic sheets are stored in stacks, it tends to be difficult to peel off or separate each magnetic sheet from the stacked ones.

The magnetic sheet according to the present invention exhibits a flexural property of usually not less than 4.5 cm, preferably not less than 4.0 cm and, therefore, is excellent in flexibility. The lower limit of the flexural property of the magnetic sheet is preferably 1.0 cm.

The magnetic sheet according to the present invention exhibits a tensile strength of usually not less than 2 MPa, preferably not less than 2.5 MPa and, therefore, is excellent in mechanical strength. The upper limit of the tensile strength of the magnetic sheet is preferably 4.0 MPa.

The magnetic sheet according to the present invention can be considerably enhanced in content of magnetic particles and can show an excellent flexibility, notwithstanding any plasticizer such as di-2-ethylhexyl phthalate, epoxidated linseed oil or butyl stearate, which have been conventionally used as an essential component when using the chlorine-containing resin, usually is used in an amount of less than 0.5 part by weight based on 100 parts by weight of the binder and preferably is not used.

Also, the magnetic sheet according to the present invention can be considerably enhanced in content of magnetic particles as well as mechanical strength even when no lubricant is used therein. However, in the consideration of flowability during the production process, the lubricant may be used in an amount of less than 1 part by weight based on 100 parts by weight of the binder. As the lubricant, there may be exemplified stearyl alcohol, stearic acid or the like.

The magnetic sheet according to the present invention may further contain, if required, appropriate additives such as various coupling agents, silica powder or the like, which have been usually blended in order to improve various properties of the magnetic sheet.

As is known in the art, the coupling agent may be contained in an amount of 0.1 to 10 parts by weight based on 100 parts by weight of the binder.

As is also known in the art, the silica powder may be contained in an amount of 0.1 to 5 parts by weight based on 100 parts by weight of the binder. In the continuous kneading process for kneading the binder and the magnetic particles together, a suitable amount of the silica powder can be continuously fed together with the pelletized binder to a kneader. This process is industrially advantageous. Further, the silica powder has the effect of enhancing a storage stability and a product stability of the obtained magnetic sheet.

Next, the process for producing the magnetic sheet according to the present invention is described below.

The magnetic sheet according to the present invention can be produced by preliminarily kneading the thermoplastic elastomer, the soft polyolefin resin and, if required, the modified resin together by an ordinary method to obtain a pelletized binder, and then feeding the pelletized binder together with magnetic particles and, if required, additives to a continuous kneader in which these components are continuously kneaded.

The important feature of the present invention is such a fact that in the case where a resin composition comprising 50 to 95% by weight of at least one thermoplastic elastomer selected from the group consisting of a styrene-isoprene-styrene block copolymer, a styrene-ethylene•butylene-styrene block copolymer and an ethylene-propylene copolymer rubber, and 5 to 50% by weight of at least one soft polyolefin selected from the group consisting of a propylene homopolymer and a propylene-ethylene copolymer is used as a binder; and where magnetic particles are blended with the binder in an amount of 400 to 1,900 parts by weight based on 100 parts by weight of the binder, the obtained magnetic sheet can be considerably enhanced in content of the magnetic particles while maintaining a good flexibility and a good mechanical strength even when the amounts of plasticizer or lubricant used is minimized, especially even when no plasticizer is used therein.

The reason why the content of magnetic particles can be considerably enhanced, is considered as follows. That is, as described in Comparative Examples hereinafter, in any of the cases (i) where the above-specified thermoplastic elastomer is used together with the above-specified soft polyolefin resin but the amounts of these binder components used are out of the above-specified ranges; (ii) where the above-specified thermoplastic elastomer is used together with a soft polyolefin resin other than the above-specified ones; and (iii) where a thermoplastic elastomer other than the above-specified ones is used together with the above-specified soft polyolefin resin, it is not possible to enhance the content of magnetic particles while maintaining a good flexibility and a good mechanical strength of the magnetic sheet. Therefore, it is considered that only when the above-specified thermoplastic elastomer and the above-specified soft polyolefin resin are blended together in the above-specified amounts, the content of magnetic particles in the magnetic sheet can be enhanced while maintaining the good flexibility and the good mechanical strength.

Thus, the magnetic sheet according to the present invention is excellent in not only flexibility and mechanical strength but also storage stability and product stability, and can be considerably enhanced in content of magnetic particles irrespective of minimizing the amounts of plasticizer and lubricant used. Therefore, the magnetic sheet according to the present invention is suitable as a fitting or attaching sheet or a sealing material for doors.

In addition, since the binder used in the magnetic sheet according to the present invention comprises no chlorine-containing resins, it is unlikely to generate hydrogen chloride during processing of the magnetic sheet, resulting in easiness upon handling. Further, even when the magnetic sheet is incinerated for disposal, any harmful substance such as dioxin is not generated and, therefore, no environmental pollution is caused.

EXAMPLES

The present invention is described in more detail by Examples and Comparative Examples, but the Examples are only illustrative and, therefore, not intended to limit the scope of the present invention.

Various properties were evaluated by the following methods.

(1) The average particle size of magnetic particles used in Examples and Comparative Examples hereinafter was expressed by the value measured by a laser diffraction-type granulometer (manufactured by Horiba Seisakusho Co., Ltd.).

(2) The magnetic properties of the magnetic particles were expressed by the values measured by a vibration sample-type magnetometer VSM-3S-15 (manufactured by Toei Kogyo Co., Ltd.).

(3) The magnetic properties of the magnetic sheet were expressed by the values obtained by measuring a surface magnetic force of a sheet specimen which was produced by cutting a hot-pressed sheet into a size of 50 mm×50 mm×1±0.1 mm and then magnetizing the cut sheet by a multiple-magnetizing device HD100 (pole pitch: 3 mm, manufactured by Denshi Jiki Kogyo Co., Ltd.), using a Gauss meter HGM8300M (manufactured by ADS Co., Ltd.).

(4) The mechanical strength of the magnetic sheet was determined as follows. First, a dumbbell-shaped test specimen No. 2 (width of parallel portion: 10 mm, length of parallel portion: 20 mm, thickness of parallel portion: not more than 3 mm, distance between bench marks: 20 mm) was prepared according to JIS K 6301-1975 ("3.2: Test specimen" in "Physical testing method for vulcanized rubbers"). The test specimen was pulled at a pulling rate of 50 mm/min. using a precision universal tester AG-1000B as a tensile tester (manufactured by Shimazu Seisakusho Co., Ltd.), thereby measuring a maximum stress (tensile strength: MPa) at which the test specimen was broken. The mechanical strength of the magnetic sheet was expressed by the measured value of the maximum stress.

(5) The flexibility of the magnetic sheet was expressed by the flexural (folding) property described at page 121 of "Bonded magnet" (1990) published by Gosei Jushi Kogyo Shinbunsha Co., Ltd., namely expressed by the length of the shortest specimen among those which were free from cracks or breakage when various test specimens being identical in width (1 cm) but different in length from each other were folded such that one end of each test specimen was overlapped on the other end thereof.

(6) The filling property of magnetic particles in the magnetic sheet was determined by visually observing whether any irregularities or holes were present on the surface of a 1 mm-thick sheet which was prepared by kneading a raw material for 20 minutes by rolls whose temperature was adjusted to 140° C., and then press-molding the kneaded material into a sheet at a temperature of 140±5° C.

Rank A: No irregularities or holes were observed; and

Rank B: Irregularities or holes were observed (7) The fogging of the magnetic sheet was determined as follows. That is, a sheet test specimen (10 mm×50 mm) was placed on a preparation glass plate (76 mm×26 mm) so as to come into close contact therewith, and allowed to stand at 60° C. for 12 hours. Thereafter, the sheet test specimen on the preparation glass plate was taken out and placed under an ordinary temperature condition, and the sheet test specimen was peeled off from the preparation glass plate. The surface of the preparation glass plate was visually observed to determine whether or not any contamination was caused thereon. The results of the observation are classified into the following two ranks.

Rank A: No contamination was observed; and

Rank B: Contamination was observed (8) The storage stability of the magnetic sheet was determined as follow. That is, three sheet test specimens (one sheet: 50 mm×50 mm×1 mm) stacked were placed in air at 60° C. while applying a load of 0.1 kg/cm$^2$ thereto. After 48 hours, the stacked test specimens were taken out and placed under a room temperature condition, and a middle specimen of the three sheet test specimens was peeled off from the other ones. The peeling conditions were visually observed. The results of the observation are classified into the following three ranks:

Rank AA: Readily peeled off and, therefore, practically usable;

Rank A: Peeled off but blocking was partially caused; and

Rank B: Peeled off but the sheet was broken, or not peelable

Example 1

A binder composed of 68 parts by weight of a thermoplastic elastomer A (styrene-ethylene•butylene-styrene block copolymer resin; CRAYTON G1657 (tradename) produced by Shell Chemical Corporation) and 32 parts by weight of a soft polyolefin resin F (propylene-ethylene copolymer; WL205 (tradename) produced by Huntsman Chemical Corporation) were blended and mixed with 1,000 parts by weight of magnetic particles C (HM410 (tradename) produced by Hoosier Magnetics Co., Ltd.). The obtained mixture was heated and melt-kneaded at a temperature of 160° C. for 20 minutes using test rolls. The obtained kneaded material was press-molded at a temperature of 140±5° C., thereby obtaining a magnetic sheet having a thickness of 1 mm.

The thus obtained magnetic sheet had a surface magnetic flux density of 300 Gauss, a tensile strength of 3.0 MPa and a flexural property (flexibility) of not more than 2.0 cm. As a result of the visual observation, neither irregularities nor holes were recognized on the surface of the magnetic sheet, and no contamination was recognized on the surface of the preparation glass sheet. Accordingly, the magnetic sheet was excellent in filling property of magnetic particles and product stability because both the properties were determined to be the Rank of A, respectively.

Further, the sheet was readily peeled off, and no blocking was recognized thereon. Accordingly, the magnetic sheet was also excellent in storage stability because the property was determined to be the Rank of A.

Examples 2 to 20 and Comparative Examples 1 to 21

The same procedure as defined in Example 1 was conducted except that kind and amount of binder, kind and amount of magnetic particles, kinds and amounts of plasticizer and lubricant and kind and amount of additive were changed variously, thereby obtaining a magnetic sheet.

The kinds and product names of binder used and various conditions are shown in Table 1. The kinds and product names of plasticizer, lubricant and additive and various conditions are shown in Table 2. Main production conditions are shown in Tables 3 to 6. Various properties of the obtained magnetic sheets are shown in Tables 7 to 10.

Meanwhile, in Comparative Example 8, since a material to be kneaded was not wound around the rolls, it was not possible to knead the material properly. As a result, the material failed to be press-molded into a sheet, namely it was difficult to obtain a magnetic sheet. In Comparative Examples 17, 20 and 21, although the material could be kneaded, many irregularities or aggregated magnetic particles due to poor dispersion were present on the surface of the press-molded sheet. Accordingly, the obtained sheet was deteriorated in tensile strength and content of magnetic particles.

TABLE 1

Kind of resin

| | |
|---|---|
| Thermoplastic elastomer A | styrene-ethylene*butylene-styrene block copolymer |
| Thermoplastic elastomer B | styrene-isoprene-styrene block copolymer |
| Thermoplastic elastomer C | ethylene-propylene |
| Thermoplastic elastomer D | Syndiotactic-1,2-polybutadiene |
| Thermoplastic elastomer E | Polyether-polyester polymer |
| Polyolefin resin F | Propylene-ethylene copolymer |
| Polyolefin resin G | Propylene homopolymer |
| Polyolefin resin H | Low-density polyethylene |
| Polyolefin resin I | Low-density polypropylene |
| Modified resin J | Ethylene-butene random copolymer |
| Modified resin K | Ethylene-propylene copolymer |
| Chlorine-containing resin L | Chlorosulfonated polyethylene |
| Chlorine-containing resin M | Chlorinated polyethylene |
| Synthetic rubber N | Polyisobutylene |
| Polyolefin resin O | Vinyl acetate copolymer |

| Kind of resin | Product name and properties |
|---|---|
| A | CRAYTON G1657 (tradename, produced by Shell Chemical Company) (rubber component: 87 wt %; styrene:ehtylene*butylene = 13:87, straight-chain structure, density: 0.91 g/cc) |
| B | HYBRAR VS-1 (tradename, produced by Kuraray Co., Ltd.) (rubber component: 70 wt %, radial structure, density: 0.94 g/cc) |
| C | EPT3070 (Mitsui Chemicals Corporation) (rubber component: 45 wt %, specific gravity: 0.86, straight-chain structure, density: 0.88 g/cc) |
| D | RB810 (tradename, produced by JSR Co., Ltd.) (density: 0.9 g/cc) |
| E | PANDEX T-5102A (tradename, produced by Dai-Nippon Ink Co., Ltd.) (density: 1.18 g/cc) |
| F | FPO W201 (tradename, produced by Huntsman Chemical Corporation) (molecular weight: 21000, density: 0.87 g/cc, softening point: 40° C.) |
| G | FPO W101 (tradename, produced by Huntsman Chemical Corporation) (molecular weight: 22000, melt flow rate: 16 g/10 min., flexural modulus: 37 Mpa, density: 0.87 g/cc, softening point: 48° C.) |
| H | LUMITAC 53-1 (tradename, produced by Tosoh Corporation) (density: 0.905 g/cc, softening point: 62° C.) |
| I | FL8013 (tradename, produced by Sumitomo Noprene Co., Ltd.) (density: 0.9 g/cc) |
| J | EBM 2011P (tradename, produced by JSR Co., Ltd.) (butene content: 20 wt %, Vicat softening point: 60° C., density: 0.88 g/cc) |
| K | EP57P (tradename, produced by JSR Co., Ltd.) (propylene content: 26 wt %, Mooney viscosity: 88, melt flow rate: 0.4 g/10 min., density: 0.87 g/cc) |
| L | HYPALON 45 (tradename, produced by DuPont Co., Ltd.) (chlorine content: 25%, density: 1.1 g/cc) |
| M | ELASLEN 301A (tradename, produced by Nitto Denkko Co., Ltd.) (chlorine content: 30%, density: 1.1 g/cc) |
| N | VISTANEX 140 (tradename, produced by Exxon Co., Ltd.) |
| O | ULTRACENE 760 (tradename, produced by Tosoh Corporation) |

TABLE 2

Magnetic particles, plasticizer, lubricant and additive

| Kind | | Product name and properties |
|---|---|---|
| Magnetic particles a | Barium ferrite particles | GP300 (produced by Toda Kogyo Co., Ltd.) (composition: $BaO \cdot 6Fe_2O_3$, average particle size: 1.9 μm, BET specific surface area: 1.5 m²/g, coercive force (IHc): 1900 Oe, residual magnetization: 40 emu/g) |
| Magnetic particles b | Rare-earth magnet particles | MQP-B (Magnequench Co., Ltd.) (composition: $Nd_2Fe_{14}B$, average particle size: 50 μm, BET specific surface area: 0.5 m²/g, coercive force (IHc): 7700 Oe, residual magnetization: 350 emu/g) |
| Magnetic particles c | Strontium ferrite particles | HM410 (Hoosier Magnetics Co., Ltd.) (composition: $SrO \cdot 6Fe_2O_3$, average particle size: 2.0 μm, BET specific surface area: 1.1 m2/g, coercive force (IHc): 1800 Oe, residual magnetization: 30 emu/g) |
| Plasticizer (1) | Di-2-ethylhexyl phthalate | DOP (tradename, produced by Dai-Hachi Kagaku Kogyo Co., Ltd.) |
| Lubricant (i) | Stearic acid | Extra pure reagent (Katayama Kagaku Co., Ltd.) |
| Additive I | Titanium coupling agent | KR TIS (tradename, produced by Ajinomoto Co., Ltd.) |

TABLE 3

Production of magnetic sheet

| | Thermoplastic elastomer | | Polyolefin resin | |
|---|---|---|---|---|
| Examples | Kind | Amount (part by weight) | Kind | Amount (part by weight) |
| Example 2 | A | 80 | F | 20 |
| Example 3 | B | 50 | G | 50 |
| Example 4 | B | 80 | F | 20 |
| Example 5 | C | 50 | G | 50 |
| Example 6 | C | 80 | F | 20 |
| Example 7 | A | 30 | G | 40 |
|  | B | 30 |  |  |
| Example 8 | B | 60 | F | 20 |
|  |  |  | G | 20 |
| Example 9 | A | 60 | G | 40 |
| Example 10 | A | 50 | F | 50 |

TABLE 4

Production of magnetic sheet

| | Thermoplastic elastomer | | Polyolefin resin | |
|---|---|---|---|---|
| Examples | Kind | Amount (part by weight) | Kind | Amount (part by weight) |
| Example 11 | C | 70 | F | 30 |
| Example 12 | A | 70 | G | 30 |
| Example 13 | A | 80 | F | 10 |
| Example 14 | C | 50 | F | 25 |
| Example 15 | B | 30 | F | 25 |
|  | A | 30 |  |  |
| Example 16 | A | 50 | F | 25 |
|  | B | 25 |  |  |
| Example 17 | B | 50 | F | 50 |

TABLE 4-continued

| Examples | | | | |
|---|---|---|---|---|
| Example 18 | C | 50 | F | 50 |
| Example 19 | A | 75 | G | 25 |
| Example 20 | A | 75 | F | 25 |

| | Production of magnetic sheet | | | |
|---|---|---|---|---|
| | Other resin | | Magnetic particles | |
| Examples | Kind | Amount (part by weight) | Kind | Amount (part by weight) |
| Example 11 | — | — | b | 800 |
| | | | a | 400 |
| Example 12 | J | 10 | a | 1700 |
| Example 13 | J | 10 | a | 1100 |
| Example 14 | K | 25 | a | 1100 |
| Example 15 | K | 15 | a | 1100 |
| Example 16 | — | — | a | 900 |
| Example 17 | — | — | b | 850 |
| Example 18 | — | — | b | 850 |
| Example 19 | — | — | a | 950 |
| Example 20 | — | — | a | 950 |

| | Production of magnetic sheet | | | |
|---|---|---|---|---|
| | Plasticizer | | Lubricant | |
| Examples | Kind | Amount (part by weight) | Kind | Amount (part by weight) |
| Example 11 | — | — | — | — |
| Example 12 | — | — | — | — |
| Example 13 | — | — | — | — |
| Example 14 | — | — | — | — |
| Example 15 | — | — | — | — |
| Example 16 | — | — | — | — |
| Example 17 | — | — | — | — |
| Example 18 | — | — | — | — |
| Example 19 | — | — | — | — |
| Example 20 | — | — | — | — |

| | Production of magnetic sheet Additive | |
|---|---|---|
| Examples | Kind | Amount (part by weight) |
| Example 11 | — | — |
| Example 12 | — | — |
| Example 13 | — | — |
| Example 14 | — | — |
| Example 15 | — | — |
| Example 16 | — | — |
| Example 17 | — | — |
| Example 18 | — | — |
| Example 19 | — | — |
| Example 20 | — | — |

TABLE 5

| | Production of magnetic sheet | | | |
|---|---|---|---|---|
| | Thermoplastic elastomer | | Polyolefin resin | |
| Comparative Examples | Kind | Amount (part by weight) | Kind | Amount (part by weight) |
| Comparative Example 1 | A | 40 | G | 60 |
| Comparative Example 2 | A | 40 | F | 60 |
| Comparative Example 3 | B | 40 | G | 60 |
| Comparative Example 4 | B | 40 | F | 60 |
| Comparative Example 5 | C | 40 | G | 60 |
| Comparative Example 6 | C | 40 | F | 60 |
| Comparative Example 7 | D | 80 | G | 20 |
| Comparative Example 8 | E | 80 | F | 20 |
| Comparative Example 9 | A | 80 | H | 20 |
| Comparative Example 10 | B | 80 | H | 20 |

| | Production of magnetic sheet | | | |
|---|---|---|---|---|
| | Other resin | | Magnetic particles | |
| Comparative Examples | Kind | Amount (part by weight) | Kind | Amount (part by weight) |
| Comparative Example 1 | — | — | a | 1100 |
| Comparative Example 2 | — | — | a | 1100 |
| Comparative Example 3 | — | — | a | 1100 |
| Comparative Example 4 | — | — | a | 1100 |
| Comparative Example 5 | — | — | a | 1100 |
| Comparative Example 6 | — | — | a | 1100 |
| Comparative Example 7 | — | — | b | 390 |
| Comparative Example 8 | — | — | b | 390 |
| Comparative Example 9 | — | — | a | 390 |
| Comparative Example 10 | — | — | a | 390 |

| | Production of magnetic sheet | | | |
|---|---|---|---|---|
| | Plasticizer | | Lubricant | |
| Comparative Examples | Kind | Amount (part by weight) | Kind | Amount (part by weight) |
| Comparative Example 1 | — | — | — | — |
| Comparative Example 2 | — | — | — | — |
| Comparative Example 3 | — | — | — | — |
| Comparative Example 4 | — | — | — | — |
| Comparative Example 5 | — | — | — | — |
| Comparative Example 6 | — | — | — | — |
| Comparative Example 7 | — | — | — | — |
| Comparative Example 8 | — | — | — | — |
| Comparative Example 9 | — | — | — | — |
| Comparative Example 10 | — | — | — | — |

TABLE 5-continued

| | Production of magnetic sheet Additive | |
|---|---|---|
| Comparative Examples | Kind | Amount (part by weight) |
| Comparative Example 1 | — | — |
| Comparative Example 2 | — | — |
| Comparative Example 3 | — | — |
| Comparative Example 4 | — | — |
| Comparative Example 5 | — | — |
| Comparative Example 6 | — | — |
| Comparative Example 7 | — | — |
| Comparative Example 8 | — | — |
| Comparative Example 9 | — | — |
| Comparative Example 10 | — | — |

TABLE 6

| | Production of magnetic sheet | | | |
|---|---|---|---|---|
| | Thermoplastic elastomer | | Polyolefin resin | |
| Comparative Examples | Kind | Amount (part by weight) | Kind | Amount (part by weight) |
| Comparative Example 11 | C | 80 | H | 20 |
| Comparative Example 12 | A | 80 | I | 20 |
| Comparative Example 13 | — | — | — | — |
| Comparative Example 14 | — | — | — | — |
| Comparative Example 15 | — | — | — | — |
| Comparative Example 16 | — | — | — | — |
| Comparative Example 17 | A | 75 | H | 13 |
| Comparative Example 18 | B | 80 | O | 20 |
| Comparative Example 19 | B | 75 | O | 13 |
| Comparative Example 20 | A | 96 | F | 4 |
| Comparative Example 21 | A | 70 | F | 10 |

| | Production of magnetic sheet | | | |
|---|---|---|---|---|
| | Other resin | | Magnetic particles | |
| Comparative Examples | Kind | Amount (part by weight) | Kind | Amount (part by weight) |
| Comparative Example 11 | — | — | a | 390 |
| Comparative Example 12 | — | — | a | 390 |
| Comparative Example 13 | L | 22 | a | 800 |
| | M | 78 | | |
| Comparative Example 14 | L | 68 | a | 900 |
| | N | 32 | | |
| Comparative Example 15 | L | 22 | a | 1100 |
| | M | 78 | | |
| Comparative Example 16 | L | 68 | a | 1100 |
| | N | 32 | | |
| Comparative Example 17 | J | 12 | a | 400 |
| Comparative Example 18 | — | — | a | 400 |
| Comparative Example 19 | J | 12 | a | 400 |
| Comparative Example 20 | — | — | a | 400 |
| Comparative Example 21 | J | 30 | a | 440 |

| | Production of magnetic sheet | | | |
|---|---|---|---|---|
| | Plasticizer | | Lubricant | |
| Comparative Examples | Kind | Amount (part by weight) | Kind | Amount (part by weight) |
| Comparative Example 11 | — | — | — | — |
| Comparative Example 12 | — | — | — | — |
| Comparative Example 13 | — | — | — | — |
| Comparative Example 14 | — | — | (i) | 3 |
| Comparative Example 15 | (1) | 11 | — | — |
| Comparative Example 16 | (1) | 6 | (i) | 3 |
| Comparative Example 17 | — | — | — | — |
| Comparative Example 18 | — | — | — | — |
| Comparative Example 19 | — | — | — | — |
| Comparative Example 20 | — | — | — | — |
| Comparative Example 21 | — | — | — | — |

| | Production of magnetic sheet Additive | |
|---|---|---|
| Comparative Examples | Kind | Amount (part by weight) |
| Comparative Example 11 | — | — |
| Comparative Example 12 | — | — |
| Comparative Example 13 | I | 3 |
| Comparative Example 14 | I | 3 |
| Comparative Example 15 | — | — |
| Comparative Example 16 | — | — |
| Comparative Example 17 | — | — |
| Comparative Example 18 | — | — |
| Comparative Example 19 | — | — |
| Comparative Example 20 | — | — |
| Comparative Example 21 | — | — |

TABLE 7

Properties of magnetic sheet

| Examples | Surface magnetic flux density (Gauss) | Tensile strength | Flexural property | Filling property | Product stability | Storage stability |
|---|---|---|---|---|---|---|
| Example 2 | 330 | 3.6 | ≦2.0 | A | A | A |
| Example 3 | 330 | 2.9 | 2.5 | A | A | A |
| Example 4 | 330 | 3.0 | 3.5 | A | A | A |
| Example 5 | 330 | 2.7 | 3.5 | A | A | A |
| Example 6 | 330 | 3.1 | 3.0 | A | A | A |
| Example 7 | 330 | 2.8 | 4.0 | A | A | A |
| Example 8 | 330 | 2.5 | 3.5 | A | A | A |
| Example 9 | 300 | 3.0 | ≦2.0 | A | A | A |
| Example 10 | 600 | 2.5 | ≦2.0 | A | A | A |

TABLE 8

Properties of magnetic sheet

| Examples | Surface magnetic flux density (Gauss) | Tensile strength | Flexural property | Filling property | Product stability | Storage stability |
|---|---|---|---|---|---|---|
| Example 11 | 450 | 2.8 | 3.0 | A | A | AA |
| Example 12 | 450 | 3.4 | ≦2.0 | A | A | AA |
| Example 13 | 330 | 3.0 | ≦2.0 | A | A | AA |
| Example 14 | 330 | 2.8 | ≦2.0 | A | A | AA |
| Example 15 | 330 | 2.8 | ≦2.0 | A | A | AA |
| Example 16 | 240 | 2.5 | ≦2.0 | A | A | A |
| Example 17 | 600 | 2.5 | 3.0 | A | A | A |
| Example 18 | 600 | 2.5 | 2.5 | A | A | A |
| Example 19 | 300 | 3.8 | ≦2.0 | A | A | A |
| Example 20 | 300 | 3.5 | 2.5 | A | A | A |

TABLE 9

Properties of magnetic sheet

| Comparative Examples | Surface magnetic flux density (Gauss) | Tensile strength | Flexural property | Filling property | Product stability | Storage stability |
|---|---|---|---|---|---|---|
| Comparative Example 1 | 330 | 2.5 | 5.0 | A | B | B |
| Comparative Example 2 | 330 | 2.5 | 5.0 | A | B | B |
| Comparative Example 3 | 330 | 3.0 | 5.0 | A | B | B |
| Comparative Example 4 | 330 | 3.0 | 5.0 | A | B | B |
| Comparative Example 5 | 330 | 2.5 | 5.0 | A | B | B |
| Comparative Example 6 | 330 | 2.5 | 5.0 | A | B | B |
| Comparative Example 7 | 250 | 2.0 | 2.0 | A | B | B |
| Comparative Example 8 | — | — | — | B | — | — |
| Comparative Example 9 | 200 | 2.0 | 6.0 | A | A | A |
| Comparative Example 10 | 200 | 2.0 | 6.0 | A | A | A |

TABLE 10

Properties of magnetic sheet

| Comparative Examples | Surface magnetic flux density (Gauss) | Tensile strength | Flexural property | Filling property | Product stability | Storage stability |
|---|---|---|---|---|---|---|
| Comparative Example 11 | 200 | 3.0 | 6.0 | A | A | A |
| Comparative Example 12 | 200 | 3.0 | 8.0 | B | A | A |
| Comparative Example 13 | 240 | 1.5 | 8.0 | A | B | B |
| Comparative Example 14 | 250 | 2.0 | 5.0 | A | B | B |
| Comparative Example 15 | 340 | 2.5 | 2.0 | A | B | B |
| Comparative Example 16 | 340 | 3.0 | 2.0 | A | B | B |
| Comparative Example 17 | 210 | 1.5 | 6.0 | B | A | A |
| Comparative Example 18 | 210 | 2.5 | 5.0 | A | A | B |
| Comparative Example 19 | 210 | 2.5 | 7.0 | A | A | B |
| Comparative Example 20 | 190 | 1.5 | 2.0 | B | B | B |
| Comparative Example 21 | 210 | 1.5 | 3.0 | B | A | A |

What is claimed is:

1. A magnetic sheet comprising:
   400 to 1,900 parts by weight of at least one kind of magnetic particles selected from the group consisting of magnetoplumbite-structure ferrite particles and rare-earth magnet particles, as a filler; and
   100 parts by weight of a binder comprising 50 to 95% by weight of at least one thermoplastic elastomer selected from the group consisting of a styrene-isoprene-styrene block copolymer resin, a styrene-ethylene-butylene-styrene block copolymer resin and an ethylene-propylene copolymer rubber, and 5 to 50% by weight of at least one soft polyolefin selected from the group consisting of a propylene homopolymer and a propylene-ethylene copolymer.

2. A magnetic sheet according to claim 1, wherein said binder further contains at least one modified resin selected from the group consisting of an ethylene-propylene-diene copolymer rubber and an ethylene-butene copolymer resin, in an amount of 5 to 30 parts by weight based on 100 parts by weight of the total amount of said thermoplastic elastomer and said soft polyolefin.

3. A magnetic sheet according to claim 1, wherein the content of the isoprene block of the styrene-isoprene-styrene block copolymer as said thermoplastic elastomer is 40 to 90% by weight, and the styrene-isoprene-styrene block copolymer has a density of 0.92 to 0.95 g/cc and a number-average molecular weight of 30,000 to 300,000.

4. A magnetic sheet according to claim 1, wherein the content of the ethylene-butylene block of the styrene-ethylene•butylene-styrene block copolymer as said thermoplastic elastomer is 63 to 87% by weight, and the styrene-ethylene•butylene-styrene block copolymer has a density of 0.90 to 0.91 g/cc.

5. A magnetic sheet according to claim 1, wherein the content of the ethylene-propylene rubber of the ethylene-propylene-copolymer rubber as said thermoplastic elastomer is 20 to 52% by weight, and the ethylene-propylene copolymer rubber has a specific gravity of 0.86 to 0.88.

6. A magnetic sheet according to claim 1, wherein said soft polyolefin has a melt flow rate at 230° C. according to ASTM D1238 of 1 to 40 g/10 min.

7. A magnetic sheet according to claim 1, wherein said soft polyolefin has a flexural modulus according to ASTM D1238 of 30 to 300 MPa, a density of 0.87 to 0.89 g/cc and a softening point of 40 to 112° C.

8. A magnetic sheet according to claim 1, wherein said binder contains a plasticizer in an amount of less than 0.5 part by weight based on 100 parts by weight of said binder and a lubricant in an amount of less than 1 part by weight based on 100 parts by weight of said binder.

9. A magnetic sheet according to claim 1, wherein said binder contains no plasticizer and lubricant.

10. A magnetic sheet according to claim 2, wherein the content of the propylene block of the ethylene-propylene-diene copolymer rubber as said modified resin is 20 to 30% by weight, and the ethylene-propylene-diene copolymer rubber has a melt flow rate at 230° C. according to ASTM D1238 of not less than 0.1 g/10 min. and less than 1 g/10 min., and a Mooney viscosity at 100° C. of 10 to 90.

11. A magnetic sheet according to claim 2, wherein the content of the butene block of the ethylene-butene copolymer as said modified resin is 18 to 35% by weight, and the ethylene-butene copolymer has a Vicat softening point according to JIS K7206 of 30 to 60° C.

12. A magnetic sheet according to claim 1, wherein said magnetoplumbite-structure ferrite particles have an average particle size of 0.1 to 20.0 $\mu$m, a BET specific surface area of 1 to 10 m$^2$/g, a coercive force (IHc) of 1,500 to 7,000 Oe and a residual magnetization of 20 to 60 emu/g.

13. A magnetic sheet according to claim 1, wherein said rare-earth magnet particles has an average particle size of 1 to 100 $\mu$m, a BET specific surface area of 0.5 to 2 m$^2$/g, a coercive force (IHc) of 3,000 to 9,000 Oe and a residual magnetization of 80 to 400 emu/g.

14. A magnetic sheet according to claim 1, which further has a surface magnetic flux density of 200 to 800 Gauss, and a tensile strength of 2.0 to 4.0 MPa.

* * * * *